March 11, 1930.  A. V. ROWE  1,750,025
ANIMAL FEEDING DEVICE
Filed Oct. 26, 1927  3 Sheets-Sheet 1
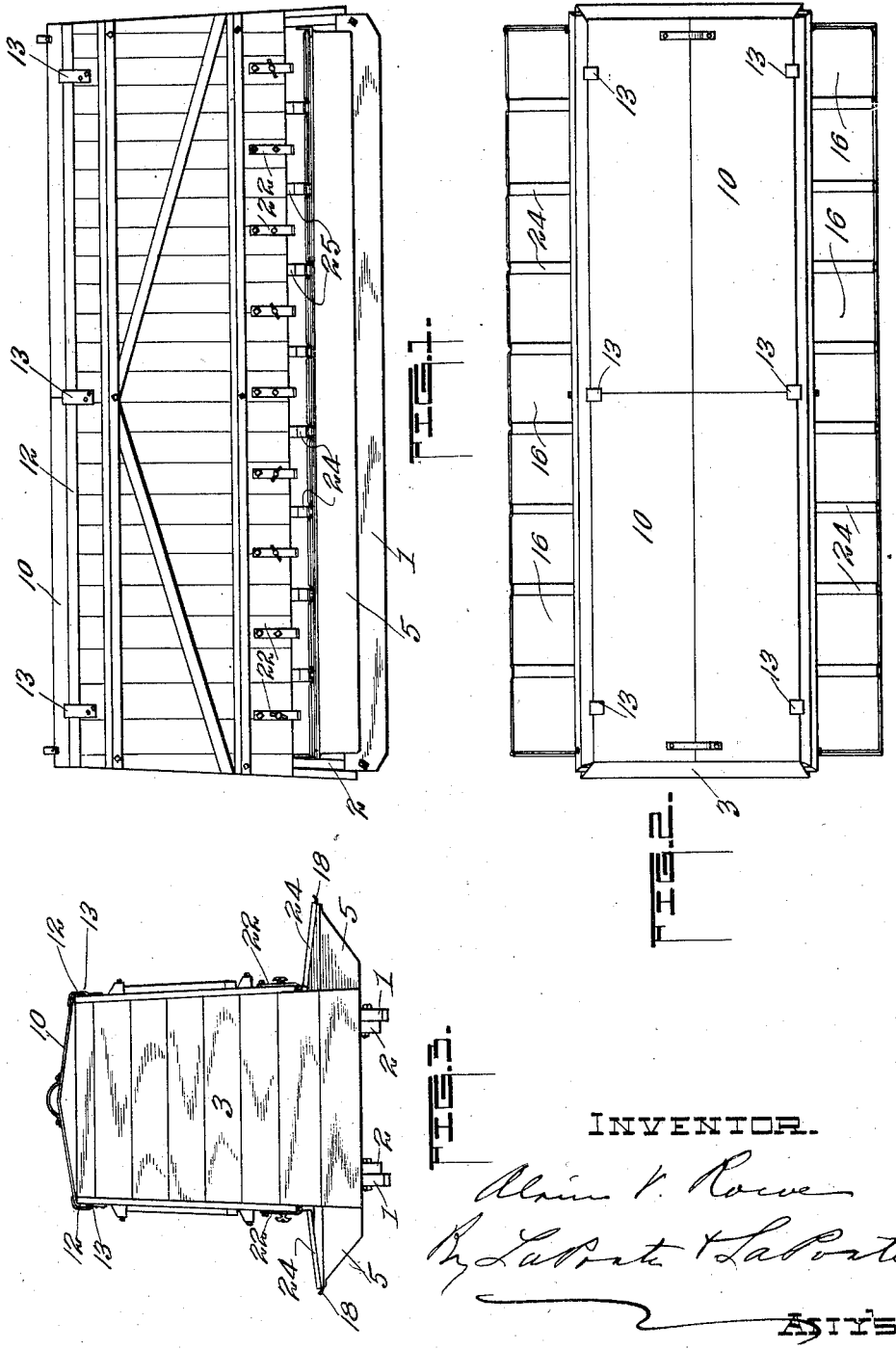

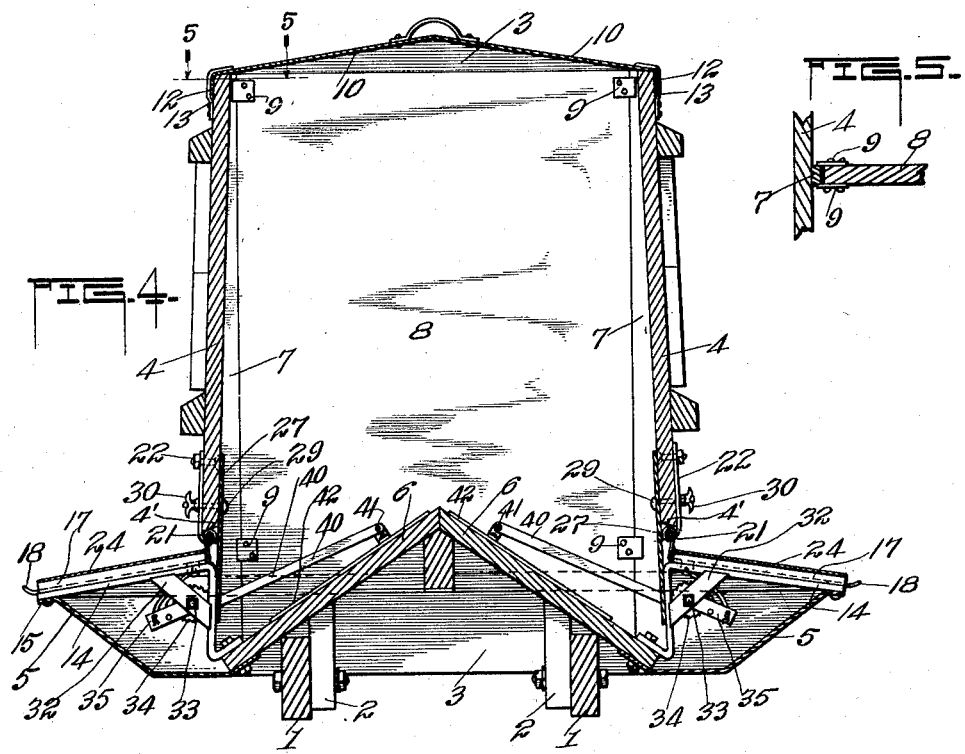
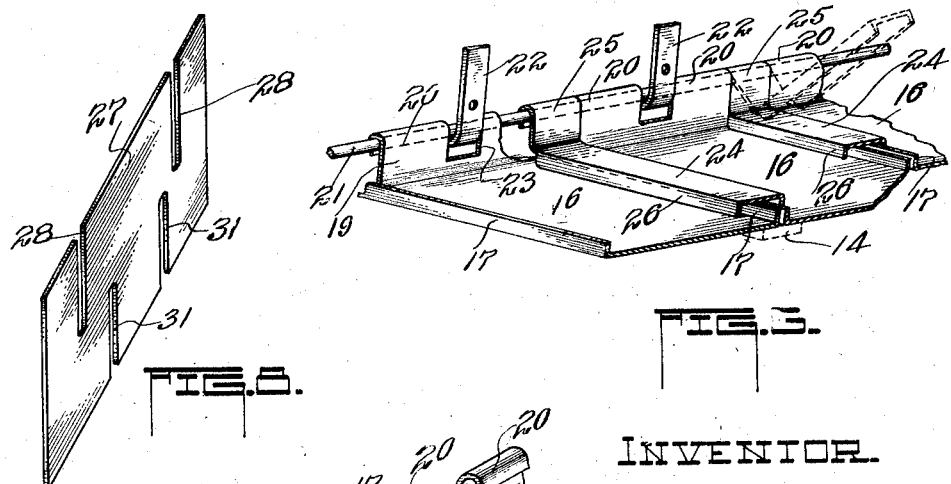
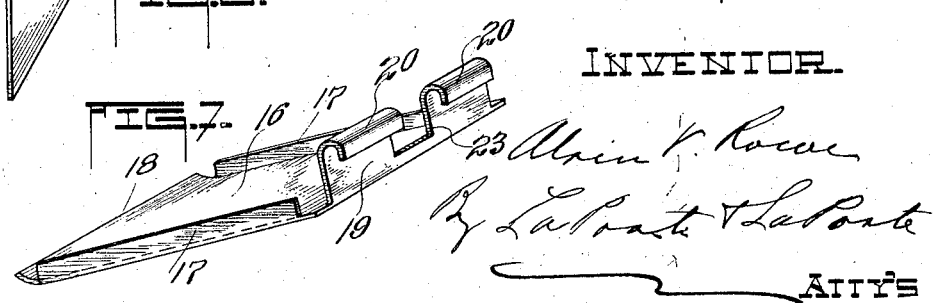

March 11, 1930.        A. V. ROWE        1,750,025
ANIMAL FEEDING DEVICE
Filed Oct. 26, 1927        3 Sheets-Sheet 3
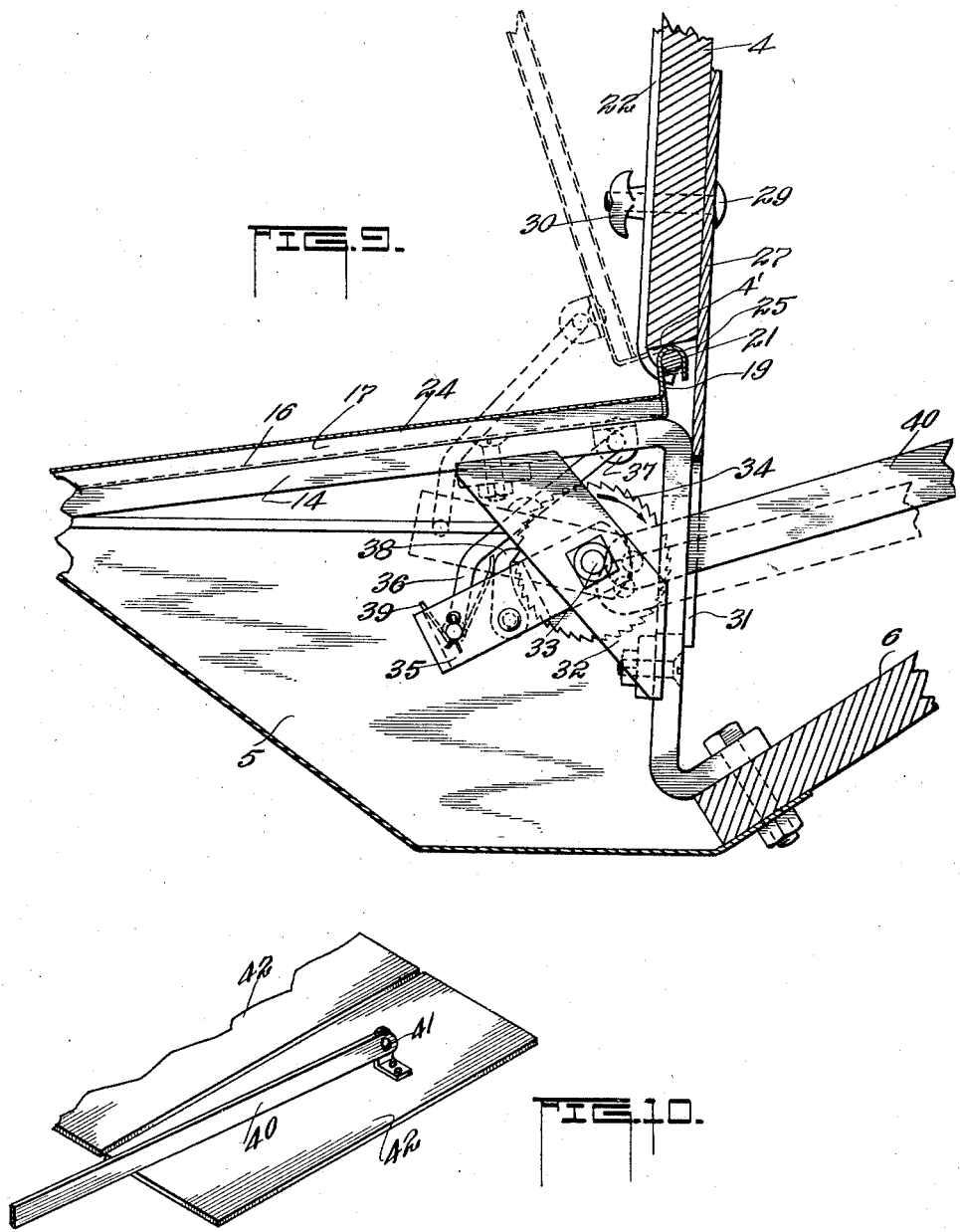
INVENTOR.
Alain V. Rowe
By LaPorte & LaPorte
Att'ys Patented Mar. 11, 1930

1,750,025

UNITED STATES PATENT OFFICE

ALVIN V. ROWE, OF GALESBURG, ILLINOIS

ANIMAL-FEEDING DEVICE

Application filed October 26, 1927. Serial No. 228,794.

This invention has reference to animal feeding devices and has for its objects:

First, to improve generally the structure providing the bins or compartments for holding the feed material, such for instance as ground oats, shell corn and the like; provision being made through an improved wall structure to prevent packing as well as bridging or arching up of the material. Such structure further including removable partitions forming the bins, and a slidable and removable top wall or cover which will readily shed rain water, also permit ventilation when necessary, and to allow for supplying grain to the housing and compartments therefor;

Second, to improve the trough structure and to provide new and improved covering means therefor, including means to prevent rain water and moisture from entering said troughs when the covering means is in closed position; in the provision of water-tight hinges for said covering means; and in the provision of adjustable controlling plates for regulating the flow and discharge of material from the bins or compartments to the troughs and thereby prevent a showering or bubbling up of the material from the troughs due to the weight and pressure of the material in the bins or compartments;

Third, to provide a floor-deck for the housing of preferably inverted V shape, with the lower edges of the inclined portions thereof terminating at or near the lower floor level of the troughs, and in the provision of movable floor plates, superimposed on such floor and carrying the weight of the material, and connections between said floor plates and the covering means for said troughs, whereby as an animal raises any one of said covering means these plates are moved to disturb the body of the feed material and cause it to flow to the troughs. This structure forms the subject matter of a co-pending application.

Fourth, to provide new and improved hinged cover plates and water and moisture shedding means associated therewith, the latter raisable and lowerable with corresponding movements imparted to the cover plates, and Lastly, to a general improvement in the design of the feeder wherein all operating parts are compactly and conveniently arranged and in the provision of runners, forming ground supports for the device as well as permitting its easy movement from one place to another.

That the invention may be more fully understood, reference is had to the accompanying drawings forming a part of the description, illustrating a preferred embodiment of the invention, in which:—

Fig. 1 is a side elevation, on a greatly reduced scale, showing one side of the feeder;

Fig. 2 is a plan view of Fig. 1;

Fig. 3 is an end view of Fig. 1;

Fig. 4 is a vertical cross-section through the feeder, on a somewhat larger scale than is shown in Figs. 1, 2 and 3;

Fig. 5 is a detail in plan, as the same would appear on the line 5—5, Fig. 4;

Fig. 6 is a detail perspective view, partly broken away and partly in section showing the arrangement of the cover plates for the troughs and the water and moisture shedding means between each plate;

Fig. 7 is a perspective view showing the formation of one of the cover plates;

Fig. 8 is a perspective view of one of the valve or controlling plates;

Fig. 9 is an enlarged detail in cross-section showing the arrangement of the movable floor cover plates for the floor-deck of the housing and full and dotted line positions of the operating means therefor, and Fig. 10 is a detail showing the construction and arrangement of such floor cover plates and an operating connection for one of such plates.

Like characters of reference denote corresponding parts throughout the several figures.

The feeder is supported and movable on ground runners 1, which preferably are arranged longitudinally of the feeder, to which are secured supports 2 connected with end walls 3. The end and side walls of the feeder slope downwardly and outwardly so that a cross-section taken either way through the feeder presents a feeder of substantially inverted V shape or pyramidal in form. The edges of the end walls have a gradual slope downwardly and outwardly, so that the side walls 4 connected thereto slope downwardly and outwardly from the top of the feeder to the troughs 5, as stated. The floor deck or bottom of the feeder comprises the upwardly converging wall sections 6 which meet and are joined centrally longitudinally of the feeder to direct feed material supported thereby downwardly and outwardly to the sides of the feeder and into the troughs 5, the lower outer edges of said sections 6 terminating at and being joined to the inner and lower wall portions of the troughs 5, which, as shown, preferably extend outwardly, horizontally for a predetermined distance and then inclined upwardly and outwardly to a suitable point removed from the sides of the feeder and at a point below the bottom edges of the side walls 4. Said wall sections 6 are connected to the supports 2 and to the runners 1, making a compact and solid housing forming the feeder proper and troughs connected thereto.

The cross-sectional shape of the feeder, presents a compartment or compartments, as the case may be, which are wider at their lower than at their upper ends, in contradistinction to feeders with which I am familiar, which have either perpendicular end and side walls or are hopper shape, being smaller at the bottom than at the top. With such a structure, as I provide, packing as well as arching-up of the feed materials is practically eliminated.

At suitable points to the inside of the side walls 4, vertically disposed cleats 7 are secured, which extend from the top to the bottom of the feeder and the inside faces of said cleats are preferably perpendicular, see Fig. 4. Removable partitions 8 are provided, having straight tops and sides, and bottom edges which conform to the sloping bottom wall sections 6, and are adapted to fit and have a vertical slidable relation with and between oppositely located pairs of cleats 7, being held in such assembled position, as shown in Fig. 4, by means of guide plates 9 secured to the partitions and overlapping the side faces of said cleats 7.

The end walls 3 have oppositely and downwardly and outwardly sloping upper edges, and as a covering or top for the feeder and the compartment or compartments therein, I provide the cover member 10, preferably of sheet metal which has oppositely and downwardly and outwardly sloping portions with flanged longitudinally disposed sides 12, which, when the cover is in position lies down and alongside the upper edge portions of the sides 4. This cover is slidable endwise into position over the feeder, from one end of the feeder and the flanged portions 12 lie under and are held in place by flanged lips or plates 13 secured to the upper and outside portions of the side walls 4. The cover, as will be understood, has a slidable relation with the lips or plates 13, when placing or removing said cover and is removable to allow for supplying grain to the housing and compartments therefor. The upper surface shape of the cover provides a natural drain for water and moisture to the sides of the feeder, and said cover may be partially moved to open position for ventilation, whenever desired.

The troughs, which are preferably made of sheet metal, are braced and held firm by brace bars 14, their outer ends being secured to a flange 15 of the troughs and their bodies then extend inwardly and upwardly at a suitable inclination, and at a point just below the lower edges of the side walls 4 they extend downwardly, and where they meet the outer edges of the bottom sections 6 are turned inwardly and upwardly and secured to said bottom wall sections, see Fig. 4.

Inasmuch as the covering means for the troughs comprise a plurality of adjacently placed and hinged plates or covers 16, I provide a plurality of such brace bars 14, one preferably for each of the adjacent sides of a pair of plates or covers 16, which form rests for said adjacent pairs of covers or plates, see Fig. 6, when the same are in lowered or closed position.

Referring more particularly to the covers or plates 16, reference being had to Fig. 7, it will be seen that I shape the same out of single pieces of sheet metal. Such plates are formed with upturned side flanges 17 and an upwardly curved outer edge portion 18 disposed beyond the outer ends of said flanges 17. These upturned edge portions enable an animal, by the use of its snout placed therebeneath, to raise the covers and permit it to project its head therebeneath and into the trough to obtain the feed material therein, and with each raising of the cover, to actuate preferably by a reciprocal movement suitable floor plates on the floor deck, as will be explained, to insure at all times a movement or flow of the feed material from the feeder proper into the troughs. Furthermore, the inner edge portions of said covers or plates for the troughs are turned upwardly, as at 19, and outwardly and downwardly, as at 20, to provide hinge members for hanging or hinging the said covers or plates to hinge rods 21 suitably held by straps 22 secured in vertical positions to the side walls 4. The flanged and curved portions, 19 and 20, of said covers or plates are cut away, as at 23, to provide open spaces in which to locate the straps 22 and provide the proper supports for the rods 21 and the covers or plates, 16, as will be understood. Furthermore, the flanges 19 as well as the flanges 17 of said covers or plates 16, are offset from corresponding corners of said plates, so that when the several covers or plates are hung adjacent each other space will be left therebetween, on the hinge rods 21, for the placing and hinging on said rods of the supplemental cover plates 24 which have the hinge portions 25 to adapt them to be hung on or hinged to the rods 21 and the bodies of said plates 24, while considerably narrower in width than the covers or plates 16 are wide enough, when in lowered position, to overlie adjacent side flanges 17 of adjacent covers or plates 16 and have turned down flanges 26 to lie down alongside and outside of flanges 17 on the respective plates 16. With this arrangement of plates 16 and supplemental plates 24 a water proof covering is provided for the troughs 5 throughout, preventing rain water and moisture from entering the troughs when said plates are in closed position, and thereby prevents souring and decaying of the feed material, which would otherwise occur if water was permitted to get into said troughs, and said covering means being inclined downwardly and away from the body of the feeder insures rain water and moisture being directed outwardly and away from the feeder and troughs. An animal on raising a cover or plate 16 will also raise one or more supplemental plates, all of which will drop back into closed position, on the animal moving away therefrom.

I provide a novel hinge arrangement for the connection of the hinge elements 20 of the cover plates 16 and elements 25 of plates 24 with the rods 21 which insures a water tight connection to prevent rain water from dripping on to the hinges which, if permitted would rust the same and allow drippings to enter the troughs and sour and decay the feed material. Such arrangement consists in sawing off the lower edges of the side walls 4 at 41 so that they are inclined downwardly and outwardly, and the hinge rods 21 are disposed longitudinally therebeneath and supported by the inturned ends of the lower ends of the straps 22, which results in placing the hinge elements 20 on said plates 16 beneath said side walls, best seen in Fig. 9. As will now be apparent, any drippings of water from the sides 4 will seek the lowest level of their faces without coming into contact with the hinges for the plates 16 and plates 24 and leaving the sides 4 will fall onto the plates 16 and 24 and be discharged from the water portions thereof without danger of entering the troughs.

The adjustable regulating or controlling plates, to which reference has been made, are designated 27, best seen in Figs. 4 and 8. These plates are preferably thin but substantial metal plates and may be provided in any number best suited to obtain the results sought and are supported for vertical adjustment against the inside of the side walls 4, see Fig. 4. Each plate has preferably the spaced vertical slots 28 extending from the upper edge of the plate downwardly through which pass bolts 29 which also pass out through a side wall 4 and a strap 22 secured thereto and on the end of each bolt is a thumb-nut 30 for clamping the plate securely in adjusted position, and when loosened will permit of vertical adjustment of the plate to raise and lower its lower edge in its relation to the bottom of the trough, whereby to regulate the opening for the passage or flow of feed material from the feeder proper into a trough, as will be understood. Having determined on the character of material to feed to the animals, it will be an easy matter to adjust and determine the position of the plate or plates 27. Each plate 27 is further preferably provided with the spaced vertically disposed slots 31, see Fig. 8, extending from the lower edge of the plate upwardly, and it is in these slots and through these slots, when the plates are in somewhat lowered positions, that certain operating means for the plates on the floor-deck or bottom, works. The bars 14 and particularly their vertical portions, see Figs. 4 and 9, brace and support the bodies of the vertically movable plates 27, especially the free lower portions thereof, which function as valves or gates to control the amount of feed material emitted from the feeder proper to the troughs. This will facilitate the easy lowering and raising of such plates, as it gives a bearing surface on which the plates may move without lateral movement, as a result of the pressure of the bulky feed material thereagainst. Furthermore, by making these plates of thin metal sheets the animals will not attack them, which might result if made of wood and they became saturated with the flavor of the feed material.

Referring now to the supplemental movable bottom plates 42 for the floor deck or bottom of the feeder and to the operating means connecting the same with the covers or plates 16, I provide when necessary and desirable, a set of such means and mechanism for each of the covers or plates 16. Reference need only be made to one such set, as they will be duplicates of each other. Secured to the angular portions of a bar 14 is a supporting plate 32 and carried by said plate is a stem 33 on which is journaled a ratchet toothed wheel 34 and a strap 35 which has a portion lying wholly on one side of said wheel and with a turned back portion lying partially on the other side of said wheel, see Fig. 9. To the outer end of this strap is pivotally connected a rod 36, which at its other end has a pivotal connection with a hanger 37 secured to the upper and inner and underside of a cover or plate 16. Also pivotally connected with said strap is a ratchet pawl 38 adapted to have ratchet tooth connection with the teeth of the ratchet wheel.

whereby to impart an intermittent rotative movement to said wheel with each raising movement of said cover or plate 16. The pawl is yieldingly held in operative engagement with the ratchet wheel and to slide back thereon, with each lowering movement of the cover or plate 16, by means of a spring plate 39 connected with the pivot of the rod 36, at the strap 35. To the ratchet wheel is pivotally connected a pitman bar 40, which has a crank-like movement with each rotative movement of the ratchet wheel and said bar 40 passes into the feeder and operates through a slot 31 in a controlling plate 27, and at its inner end has a pivotal connection, at 41, with a plate 42, see Figs. 4 and 10. which, as stated, is superimposed and has reciprocal movement forward and backward on a floor deck section 6 of the feeder proper. It will now be apparent, with feed material lying on and above the plate 42 that as the bar 40 is moved forward and backward that such plate will keep the feed material in a state of agitation or will so disturb the same as to insure its delivery from the feeder to the trough or troughs. The position of the lower edge of the controlling plate or plates 27 will regulate the quantity and amount of the material being delivered to the trough and by regulating the said plates 27, where their lower edges are well below the outer and upper edge portions of the troughs 5 showering or bubbling up of the feed material in the troughs, such as will cause overflowing of the troughs, is eliminated and prevented.

What I claim is:—

1. In an animal feeding device, in combination, a housing, a feed trough in communication therewith, a hinge bar supported from and longitudinally of said housing, a plurality of spaced bars bracing said trough and connected therewith and with said housing, a plurality of adjacently placed cover members for said trough having a hinged connection with said bar and having upturned side flanges and curved edges along their free ends, the adjacent flange portions of pairs of said cover members normally resting on a common brace bar, and a plurality of supplemental cover members having a hinged connection with said bar, one overlying each of the adjacent flange portions of pairs of said first mentioned cover members and movable with the latter when raised, and provided with turned down flanges along opposite edges adapted to overlie the flange portions of said first mentioned cover members.

2. A covering for the trough of a feeding device, comprising adjacently placed cover members having elements at one end portion to hingedly support the same and upturned edges at their opposite end portions and upturned flanges along opposite side edges, and supplemental cover members adapted to overlie the flanges of said adjacent cover members and having hinge elements at one end thereof.

3. In an animal feeding device, in combination, a housing, feed troughs adjacent certain of the side walls of the housing, and in communication with said housing, said side walls terminating short of the troughs and having under inclined edge portions forming water sheds, hinge rods supported below said shed portions, a plurality of adjacently arranged cover plates for said troughs having hinged portions connected with said rods, a plurality of spaced supplemental cover plates adapted to normally overlie the adjacent edges of pairs of cover plates and having hinged portions connected with said rods, the hinged portions of said cover and supplemental plates being disposed beneath said water sheds.

4. In an animal feeding device, in combination, a housing, feed troughs adjacent certain of the side walls of the housing, and in communication with said housing, said side walls terminating short of the troughs and having under outwardly and downwardly inclined lower edge portions forming water sheds, hinge means supported below said shed portions, a plurality of cover plates for said troughs hingedly connected with said hinge means and inclined downwardly and outwardly therefrom, the arrangement of the water shed and the connection of the cover plates with the hinge means and their inclination therefrom so provided as to direct water from the sides of the housing away from the hinge means and outwardly over the cover plates.

In witness whereof, I have hereunto affixed my hand this 17th day of October, 1927.

ALVIN V. ROWE.